(12) United States Patent
Hamaguchi et al.

(10) Patent No.: US 11,467,011 B2
(45) Date of Patent: Oct. 11, 2022

(54) SUPPORT STRUCTURE FOR METER STAY (71) Applicant: Honda Motor Co., Ltd., Tokyo (JP)

(72) Inventors: Daiki Hamaguchi, Kumamoto (JP); Keita Mikura, Kumamoto (JP); Takayuki Haramoto, Kumamoto (JP); Takumi Kosuga, Kumamoto (JP); Yuki Kanemura, Kumamoto (JP)

(73) Assignee: HONDA MOTOR CO., LTD., Tokyo (JP)

( * ) Notice: Subject to any disclaimer, the term of this patent is extended or adjusted under 35 U.S.C. 154(b) by 868 days.

(21) Appl. No.: 16/366,520

(22) Filed: Mar. 27, 2019

(65) Prior Publication Data
US 2019/0301903 A1 Oct. 3, 2019

(30) Foreign Application Priority Data

Mar. 28, 2018 (JP) .............................. JP2018-062913

(51) Int. Cl.
*B62K 19/40* (2006.01)
*G01D 11/30* (2006.01)
(Continued)

(52) U.S. Cl.
CPC .......... *G01D 11/305* (2013.01); *B62J 50/225* (2020.02); *B62K 19/30* (2013.01);
(Continued)

(58) Field of Classification Search
CPC ....... G01D 11/305; B62J 50/225; B62J 23/00; B62K 19/30; B62K 19/40; B62K 21/04; B62K 21/18; B60K 35/00
See application file for complete search history.

(56) References Cited

U.S. PATENT DOCUMENTS 8,628,103 B2 * 1/2014 Kawai .................... B62J 50/225
74/551.8
8,960,701 B2 * 2/2015 Watanabe .............. B62K 25/08
280/276

(Continued)

FOREIGN PATENT DOCUMENTS

CN 102642585 A 8/2012
CN 102811990 A 12/2012
(Continued)

OTHER PUBLICATIONS

Indian Office Action and Search Report, dated Jun. 25, 2020, for Indian Application No. 201914010177, with an English translation.

*Primary Examiner* — Tony H Winner
*Assistant Examiner* — Marlon A Arce
(74) *Attorney, Agent, or Firm* — Birch, Stewart, Kolasch & Birch, LLP (57) ABSTRACT

A support structure for a meter stay applied to a saddled vehicle including a top bridge coupling upper ends of a left-right pair of front forks; a handle clamp supporting a steering handle above the top bridge; and a meter stay supporting a meter device, in which a shaft member extends downwardly and is positioned on a lower surface of the handle clamp; an elastic member is disposed to abut a lower surface of the top bridge; the meter stay is placed to be in contact with a lower surface of the elastic member; and the shaft member passes through the top bridge, the elastic member, and the meter stay in this order, with a fixing member being coupled to a distal end of the shaft member.

20 Claims, 12 Drawing Sheets

(51) Int. Cl.
   *B62J 50/21*   (2020.01)
   *B62K 19/30*   (2006.01)
   *B62J 23/00*   (2006.01)
   *B62K 21/18*   (2006.01)
   *B62K 21/04*   (2006.01)

(52) U.S. Cl.
   CPC ............... *B62K 19/40* (2013.01); *B62J 23/00* (2013.01); *B62K 21/04* (2013.01); *B62K 21/18* (2013.01)

(56) References Cited

U.S. PATENT DOCUMENTS

| | | | |
|---|---|---|---|
| 10,661,850 B2 * | 5/2020 | Fukuyama | ............. B62K 21/04 |
| 2007/0284172 A1 | 12/2007 | Satake et al. | |
| 2008/0054138 A1 * | 3/2008 | Ieda | ....................... B62K 19/30 |
| | | | 248/214 |
| 2016/0031520 A1 | 2/2016 | Tomura et al. | |

FOREIGN PATENT DOCUMENTS

| | | |
|---|---|---|
| CN | 105314042 A | 2/2016 |
| EP | 2489582 A2 | 8/2012 |
| EP | 2979965 A1 | 2/2016 |
| JP | 6-32270 A | 2/1994 |
| JP | 2007-276624 A | 10/2007 |
| JP | 2016-190506 A | 11/2016 |
| JP | 6071595 B2 | 2/2017 |
| WO | WO 2011/118291 A1 | 9/2011 |

* cited by examiner

SUPPORT STRUCTURE FOR METER STAY

BACKGROUND

1. Technical Field

The present invention relates to a support structure for a meter stay, and in particular to a support structure for a meter stay applied to a saddled vehicle in which a steering handle is fixed to an upper part of a top bridge.

2. Description of the Background

In a conventional saddled vehicle, a meter device supported by a meter stay is disposed on a vehicle body front side of a steering handle.

Patent Literature 1 discloses a constitution in which, in a motorcycle provided with a left-right pair of front forks that rotatably support a front wheel, a top bridge that couples upper ends of the left and right front forks, and a bottom bridge that couples the left and right front forks below the top bridge, a meter stay that supports a meter device is attached to a fork bracket fixed between the top bridge and the bottom bridge.

CITATION LIST

Patent Literature

Patent Literature 1: Japanese Laid Open Patent Application No. 2007-276624

BRIEF SUMMARY

Here, it is conceivable to eliminate the fork bracket as disclosed in Patent Literature 1 and attach the meter stay directly to the top bridge. However, doing so requires that a mount for the meter stay be made a floating mount by means of an elastic member to protect the meter device from vibration. In addition, particularly in a vehicle in which the steering handle is fixed to an upper part of the top bridge, there have been problems of arrangement space for the elastic member being limited and the support structure becoming complicated.

It is an object of the present invention to provide a support structure for a meter stay capable of solving the problems of the above conventional technology and efficiently attaching a steering handle and a meter stay to a top bridge.

According to a first aspect of the present invention, in a support structure for a meter stay applied to a saddled vehicle (1) includes a left-right pair of front forks (10) rotatably supporting a front wheel (WF); a top bridge (5) coupling upper ends of the left and right front forks (10); a handle clamp (54) supporting a steering handle (3) above the top bridge (5); and a meter stay (51) supporting a meter device (50), a shaft member (55) extends downwardly and is disposed on a lower surface of the handle clamp (54); an elastic member (58a) is disposed to be in contact with a lower surface of the top bridge (5); the meter stay (51) is in contact with a lower surface of the elastic member (58a); and the shaft member (55) passes through the top bridge (5), the elastic member (58a), and the meter stay (51) in this order, with a fixing member (56) being coupled to a distal end of the shaft member (55).

According to a second aspect of the present invention, the top bridge (5) has a through hole (5d) through which the shaft member (55) passes; and a hemispherical enlarged diameter part (5c) is formed in the through hole (5d) for accommodating the elastic member (58a) on the lower surface side of the top bridge (5).

According to a third aspect of the present invention, the meter stay (51) has a fitting part (52a) having an opening (52d) for accommodating the meter device (50); and the meter device (50) includes an upper case (50a) and a lower case (50b), and the meter device (50) is supported by the meter stay (51) by affixing the upper case (50a) and the lower case (50b) with the fitting part (52a) being sandwiched between the upper case (50a) and the lower case (50b).

According to a fourth aspect of the present invention, a concavo-convex section (60, 61) is disposed between the opening (52d) and the lower case (50b) to perform positioning in a direction of mutual rotation therebetween.

According to a fifth aspect of the present invention, a second concavo-convex section (50c, 57a) is disposed between the upper case (50a) and the lower case (50b) to perform positioning in both rotation directions thereof.

According to a sixth aspect of the present invention, an upper spacer (90) is disposed between the upper case (50a) and the meter stay (51) to cause the upper case (50a) to be inclined by a predetermined angle, and a lower spacer (91) is disposed between the meter stay (51) and the lower case (50b) to cause the lower case (50b) to be inclined by the same angle as that in the upper case (50a).

According to a seventh aspect of the present invention, a lower concavo-convex section (91a) is formed in a lower part of the lower spacer (91) and engages with the concavo-convex section (61) of the lower case (50b) to perform positioning in the rotation direction, and an upper concavo-convex section (91b) is formed in an upper part of the lower spacer (91) and engages with the concavo-convex section (60) formed in the opening (52d) to perform positioning.

According to an eighth aspect of the present invention, a second elastic member (58b) is disposed between the handle clamp (54) and the top bridge (5) to be penetrated by the shaft member (55).

According to a ninth aspect of the present invention, the elastic member (58a) and the second elastic member (58b) are common components.

According to a tenth aspect of the present invention, a hemispherical enlarged diameter part (5c) is formed in the through hole (5d) for accommodating the second elastic member (58b) on an upper surface side of the top bridge (5).

According to the first aspect, in a support structure for a meter stay applied to a saddled vehicle (1) including a left-right pair of front forks (10) rotatably supporting a front wheel (WF); a top bridge (5) coupling upper ends of the left and right front forks (10); a handle clamp (54) supporting a steering handle (3) above the top bridge (5); and a meter stay (51) supporting a meter device (50), a shaft member (55) extends downwardly and is positioned on a lower surface of the handle clamp (54); an elastic member (58a) is disposed to be in contact with a lower surface of the top bridge (5); the meter stay (51) is in contact with a lower surface of the elastic member (58a); and the shaft member (55) passes through the top bridge (5), the elastic member (58a), and the meter stay (51) in this order, with a fixing member (56) being coupled to a distal end of the shaft member (55). Therefore, it is possible to mount the meter stay on the lower surface side of the top bridge in a floating manner by using the shaft member and the fixing member for affixing the handle clamp to the top bridge. Compared with a constitution in which the attachment part of the handle clamp and the attachment part of the meter stay are separately provided on the top bridge, it is thereby possible to simplify the support structure, reduce the number of parts, and also achieve a reduction in size of the top bridge. Further, since the meter stay is mounted in a floating manner, there is no need to provide an elastic member between the meter device and the meter stay, and so the degree of freedom in designing the meter device and the meter stay can be enhanced.

According to the second aspect, the top bridge (5) has a through hole (5d) through which the shaft member (55) passes; and a hemispherical enlarged diameter part (5c) is formed in the through hole (5d) for accommodating the elastic member (58a) on the lower surface side of the top bridge (5). Therefore, by the elastic member being accommodated in the enlarged diameter part formed on the lower surface side of the top bridge, it is possible to minimize the amount of protrusion of the elastic member toward the lower surface side of the top bridge, which enables a reduction in size in the thickness dimension in the vicinity of the top bridge. Further, the elastic member is hardly visible from the outside, and therefore the appearance around the top bridge can be enhanced.

According to the third aspect, the meter stay (51) has a fitting part (52a) having an opening (52d) that accommodates the meter device (50); and the meter device (50) includes an upper case (50a) and a lower case (50b), and the meter device (50) is supported by the meter stay (51) by affixing the upper case (50a) and the lower case (50b) with the fitting part (52a) being sandwiched between the upper case (50a) and the lower case (50b). As a result, it is possible to easily support the meter device with the meter stay. In addition, a simple appearance can be imparted to the meter device and the meter stay.

According to the fourth aspect, a concavo-convex section (60, 61) is disposed between the opening (52d) and the lower case (50b) to perform positioning in a direction of mutual rotation therebetween. As a result, it is possible to perform positioning in a rotation direction of the meter device with a simple constitution. Also, when affixing the meter device to the meter stay, the assembly work is facilitated by the position of the lower case in the rotational direction being determined.

According to the fifth aspect, a second concavo-convex section (50c, 57a) is disposed between the upper case (50a) and the lower case (50b) to perform positioning in both rotation directions thereof. Therefore, assembly of the meter device is facilitated by the upper case being positioned with respect to the lower case, which has been positioned on the meter stay.

According to the sixth aspect, an upper spacer (90) is disposed between the upper case (50a) and the meter stay (51) to cause the upper case (50a) to be inclined by a predetermined angle, and a lower spacer (91) is disposed between the meter stay (51) and the lower case (50b) to cause the lower case (50b) to be inclined by the same angle as that in the upper case (50a). Therefore, it is possible to arbitrarily change the angle of the meter device by sandwiching the spacers having a simple structure. It is thereby not necessary to provide an angle adjustment function on the meter stay side, and so the structure of the meter stay can be simplified.

According to the seventh aspect, a lower concavo-convex section (91a) is formed in the lower part of the lower spacer (91) and engages with the concavo-convex section (61) of the lower case (50b) to perform positioning in the rotation direction, and an upper concavo-convex section (91b) is formed in the upper part of the lower spacer (91) and engages with the concavo-convex section (60) formed in the opening (52d) to perform positioning. Therefore, positioning of the meter device in the rotational direction can be performed easily even when the upper spacer and the lower spacer are applied.

According to the eighth aspect, a second elastic member (58b) penetrated by the shaft member (55) is disposed between the handle clamp (54) and the top bridge (5). Therefore, the handle clamp can be mounted in a floating manner with the second elastic member simultaneously with mounting the meter stay in a floating manner with the elastic member.

According to the ninth aspect, the elastic member (58a) and the second elastic member (58b) are made common parts. Therefore, it is possible to reduce the manufacturing cost and prevent erroneous assembly by achieving common parts utilization of the elastic members.

According to the tenth aspect, a hemispherical enlarged diameter part (5c) is formed in the through hole (5d) for accommodating the second elastic member (58b) on an upper surface side of the top bridge (5). Therefore, by the second elastic member being accommodated in the enlarged diameter part formed on the upper surface side of the top bridge, it is possible to minimize the amount of protrusion of the second elastic member toward the upper surface side of the top bridge, and the appearance around the top bridge can be enhanced.

DETAILED DESCRIPTION

Figure 1:
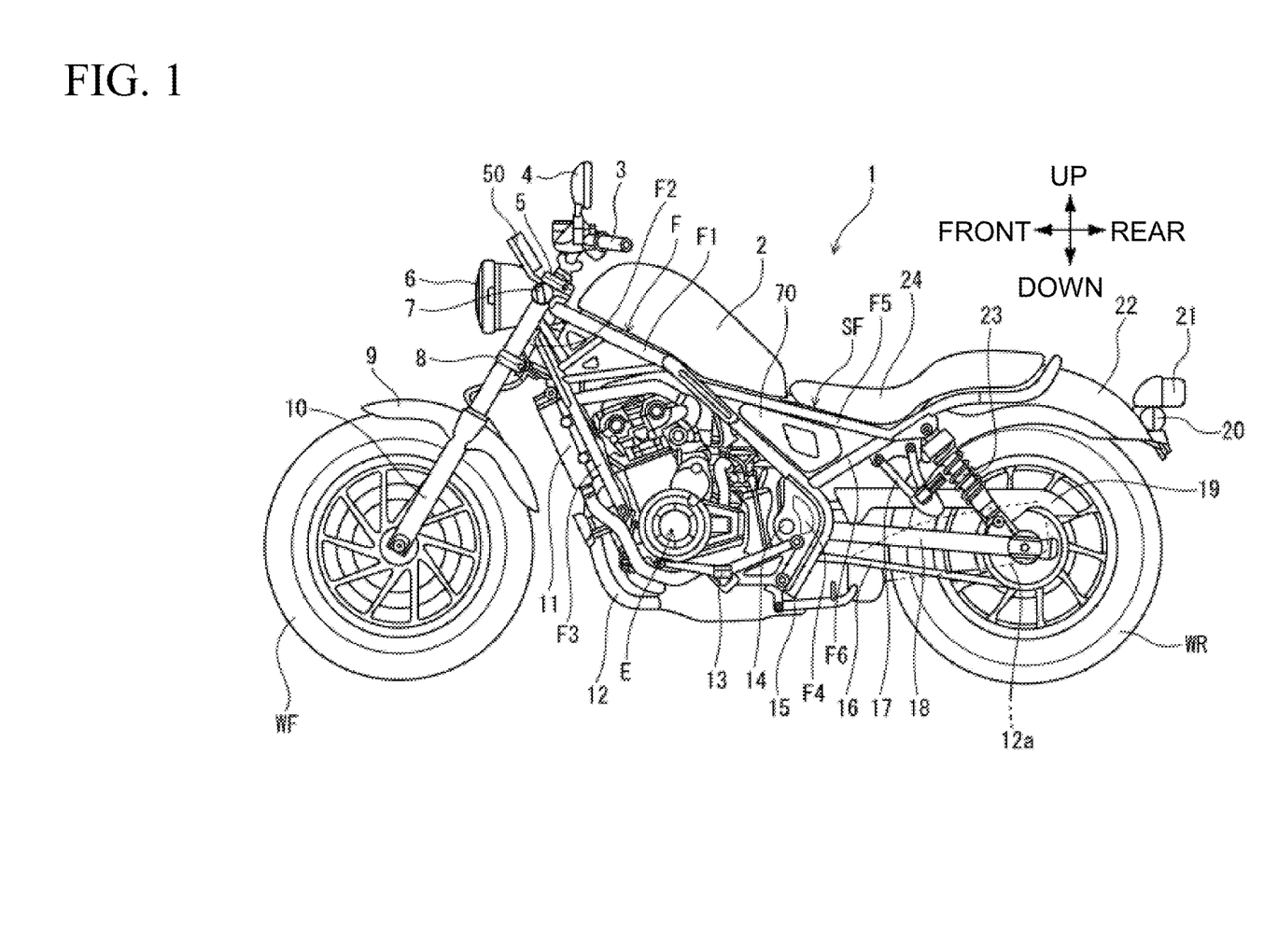
FIG. 1 is a left side view of a motorcycle to which a support structure for a meter stay according to one embodiment of the present invention is applied.

Hereinbelow, preferred embodiments of the present invention will be described in detail referring to the appended drawings. FIG. 1 is a left side view of a motorcycle 1 to which a support structure for a meter stay according to one embodiment is applied. A vehicle body frame F of the motorcycle 1 includes a left-right pair of main frames F1 extending from a head pipe F2 downward and toward a rear of a vehicle body, a left-right pair of hanger frames F3 located below the main frames F1 and extending from the head pipe F2 downward and toward the rear of the vehicle body, and a left-right pair of pivot frames F4 respectively coupled to a lower rear part of the main frames F1. A seat frame SF extending downward and toward the rear by including a left-right pair of upper pipes F5 and lower pipes F6 is coupled to a rear part of the main frames F1.

An engine E is supported between the main frames F1 and the hanger frames F3, and a radiator 11 is disposed at a front part of the hanger frames F3. Combustion gas of the engine E is discharged from a muffler 12a on a right side in a vehicle width direction via an exhaust pipe 12. A side stand 15 is swingably supported at a lower end of the pivot frame F4 on a left side in the vehicle width direction. A left-right pair of foot steps 13 are attached at positions in front of the side stand 15.

The pivot frames F4 support a pivot shaft 14 that pivotally supports a front end of a swingarm 18 so as to freely swing. Driving force of the engine E is transmitted via a drive chain 16 to a rear wheel WR rotatably supported by a rear end of the swingarm 18. A chain cover 19, which covers an upper part of the drive chain 16, is attached to an upper part of the swingarm 18, and the rear of the swingarm 18 is suspended from the seat frame SF by a left-right pair of rear cushions 23. A left-right pair of pillion step holders 17 are respectively attached to the lower pipes F6 located in front of the rear cushions 23.

The left-right pair of front forks 10 for rotatably supporting the front wheel WF are supported by a top bridge 5 and a bottom bridge 8 at upper and lower positions, respectively, of the head pipe F2. A stem shaft (not shown) that vertically couples the top bridge 5 and the bottom bridge 8 is supported by the head pipe F2 to be rotatable thereabout. A steering handle 3 extending in the vehicle width direction is fixed to an upper part of the top bridge 5, with rearview mirrors 4 being attached to the steering handle 3. A meter device 50 is supported by the top bridge 5, and a headlight 6 is supported by the bottom bridge 8. A left-right pair of front turn signals 7 are supported by the front forks 10 at positions below the top bridge 5.

A fuel tank 2 is supported by upper parts of the main frames F1, and a seat 24 is disposed behind the fuel tank 2. A side cover 70 is disposed below the seat 24 at a position surrounded by the main frame F1, the upper pipe F5 and the lower pipe F6. A tail lamp 21 and a left-right pair of rear turn signals 20 are attached to a rear fender 22 disposed behind the seat 24.

Figure 2:
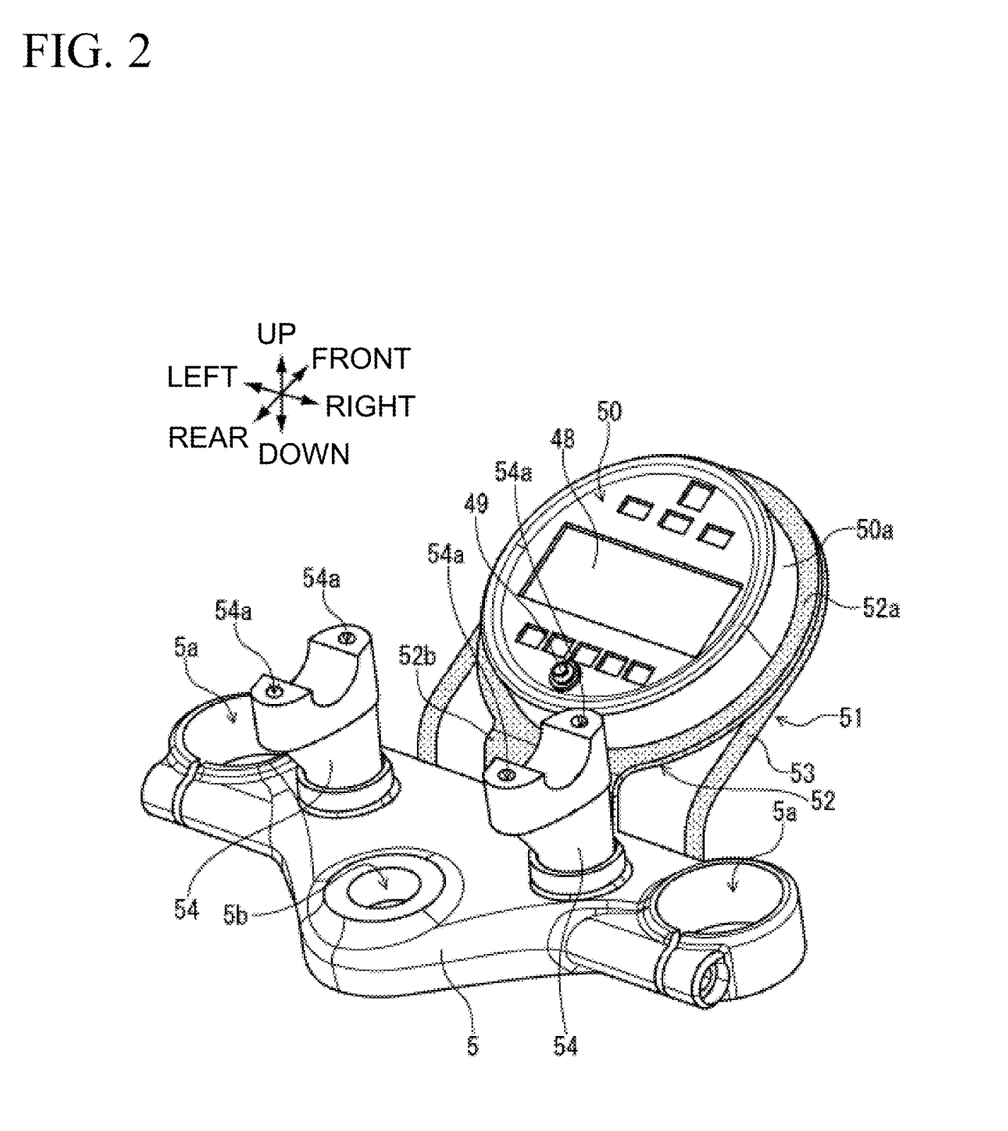
FIG. 2 is a perspective view showing a top bridge and a meter device in a supported state.
Figure 3:
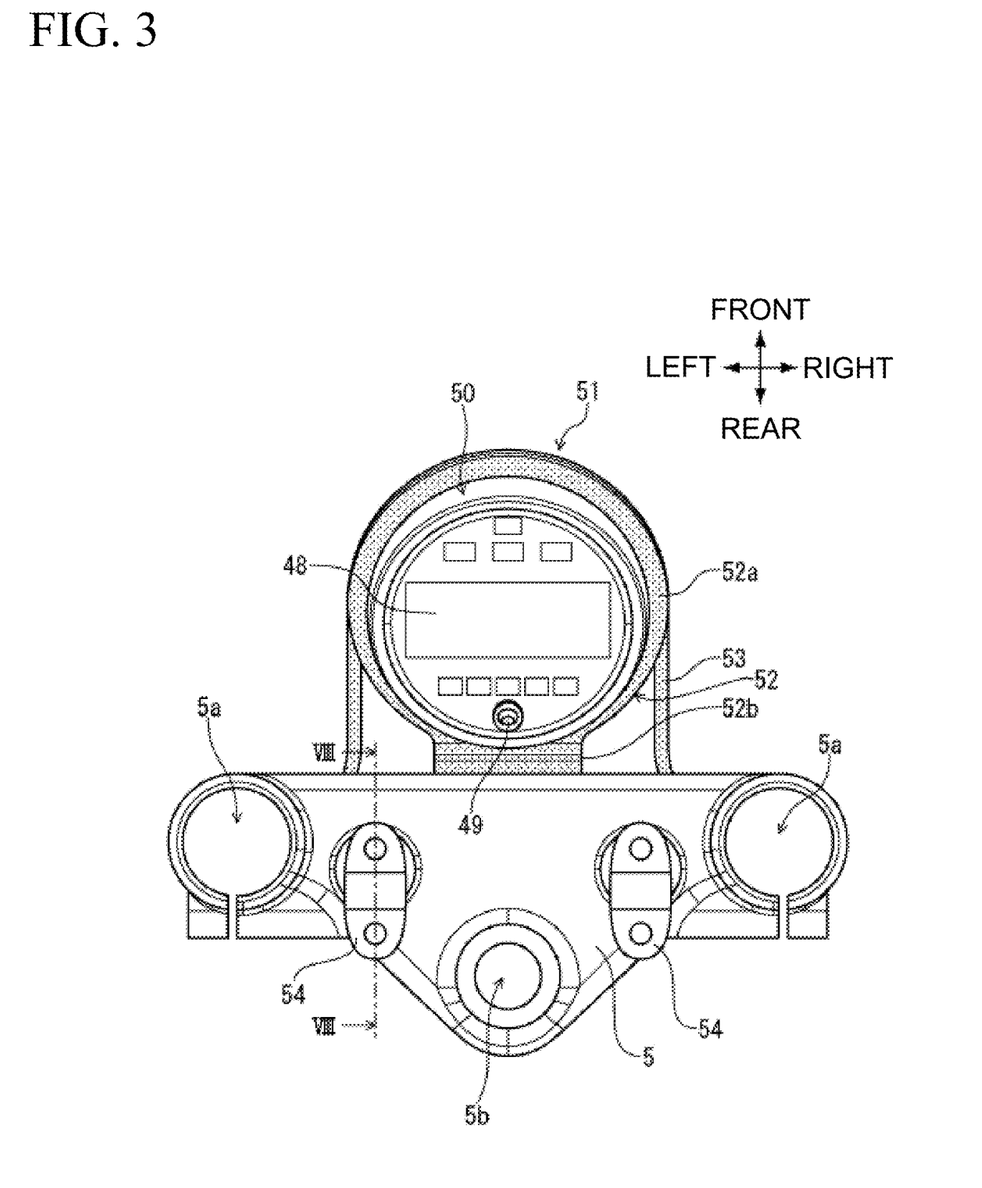
FIG. 3 is a plan view showing the top bridge and the meter device in a supported state.
Figure 4:
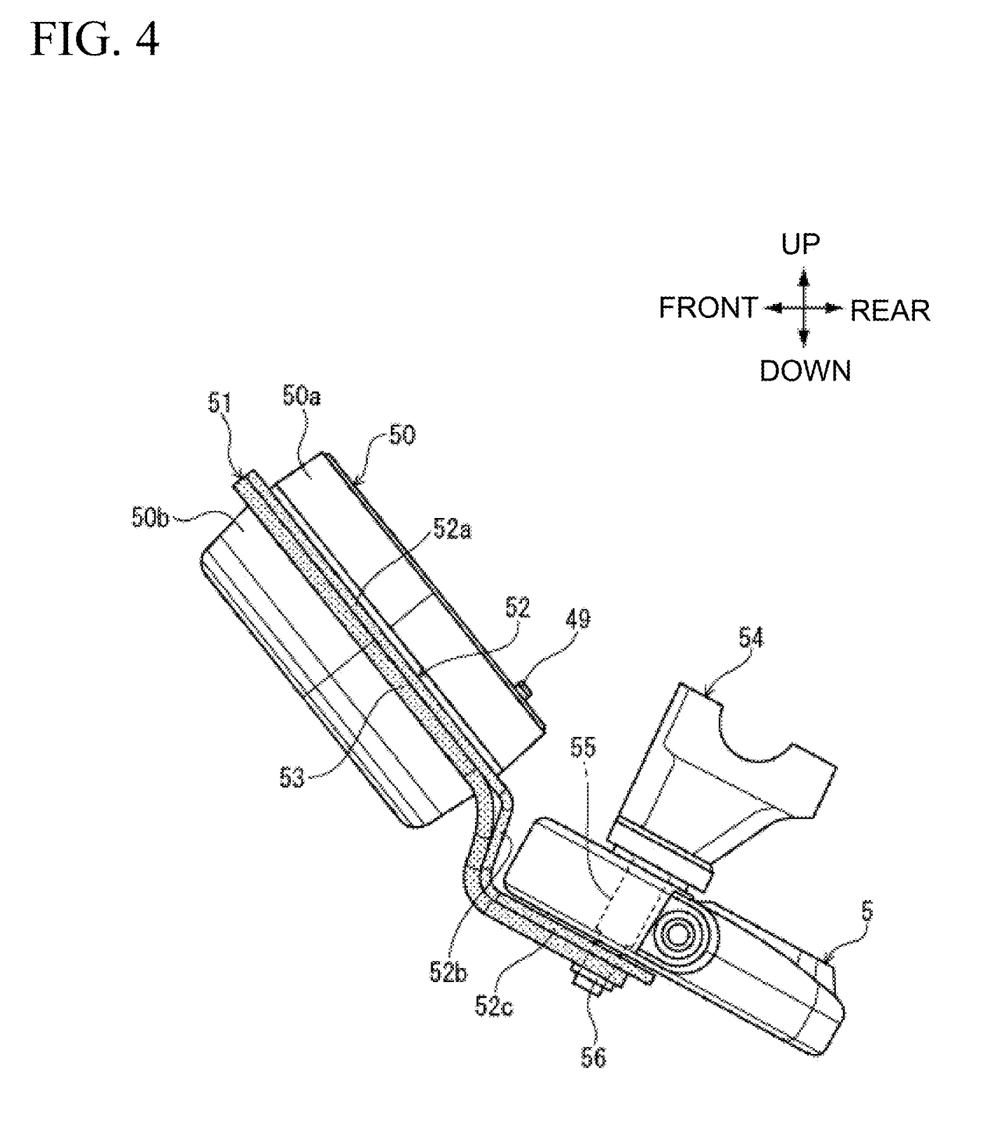
FIG. 4 is a left side view showing the top bridge and the meter device in a supported state.

FIG. 2 is a perspective view showing the top bridge 5 and the meter device 50 in a supported state. FIG. 3 is a plan view thereof, and FIG. 4 is a left side view thereof. Clamp holes 5a for supporting the upper ends of the front forks 10 are formed at both ends in the vehicle width direction of the top bridge 5, which is formed by aluminum casting or the like. A through hole 5b to which the stem shaft (not shown) is non-rotatably fixed is formed in the middle of the top bridge 5 in the vehicle width direction toward the rear of the vehicle body, with the stem shaft being pivotally supported by the head pipe F2. In the position between the clamp holes 5a and the through hole 5b, a left-right pair of handle clamps 54 for supporting the steering handle 3 are attached. Each handle clamp 54, together with an upper clamp (not shown), is configured to clamp and fix the pipe-shaped steering handle 3 by bolts screwed into screw holes 54a.

The meter device 50 positioned in front of the top bridge 5 is supported by a meter stay 51 affixed to a lower surface of the top bridge 5. The meter stay 51, which is formed of metal or the like, includes a plate-shaped part 52 having a thin plate shape and a round bar member 53 welded to the lower surface side of the plate-shaped part 52. The plate-shaped part 52 is an integrally molded component having an annular fitting part 52a for holding the outer periphery of the meter device 50, a support part 52c with a wide width disposed adjacent to the lower surface of the top bridge 5, and a coupling part 52b with a narrow width that couples the fitting part 52a and the support part 52c.

A liquid crystal panel showing vehicle speed and the like and various indicators are provided in the substantially cylindrical meter device 50 having an upper case 50a and a lower case 50b formed of a synthetic resin or the like. A colorless transparent or colored transparent cover member 48 is disposed on an upper surface of the upper case 50a, and an operation button 49 for switching the display of the liquid crystal panel protrudes through the cover member 48.

Referring to FIG. 4, a shaft member 55 extends downwardly and is positioned on a lower surface of each handle clamp 54. The shaft member 55 penetrates the top bridge 5 and the support part 52c of the meter stay 51, with a nut 56 as a fixing member being screwed onto a lower end of the shaft member 55. That is, the meter stay 51 is fastened to a back surface side of the top bridge 5 using the shaft member 55 and the nut 56 for attaching each handle clamp 54 to the top bridge 5. The round bar member 53 constituting a part of the meter stay 51 not only functions as a design accent but also suppresses vibration of the meter device 50 by supporting the fitting part 52a from the back surface side thereof, and plays a protective role so that the throttle cable and the like do not come into contact with the corners of the fitting part 52a. A hook or the like for guiding the arrangement direction of the various cables can be attached to the round bar member 53.

Figure 5:
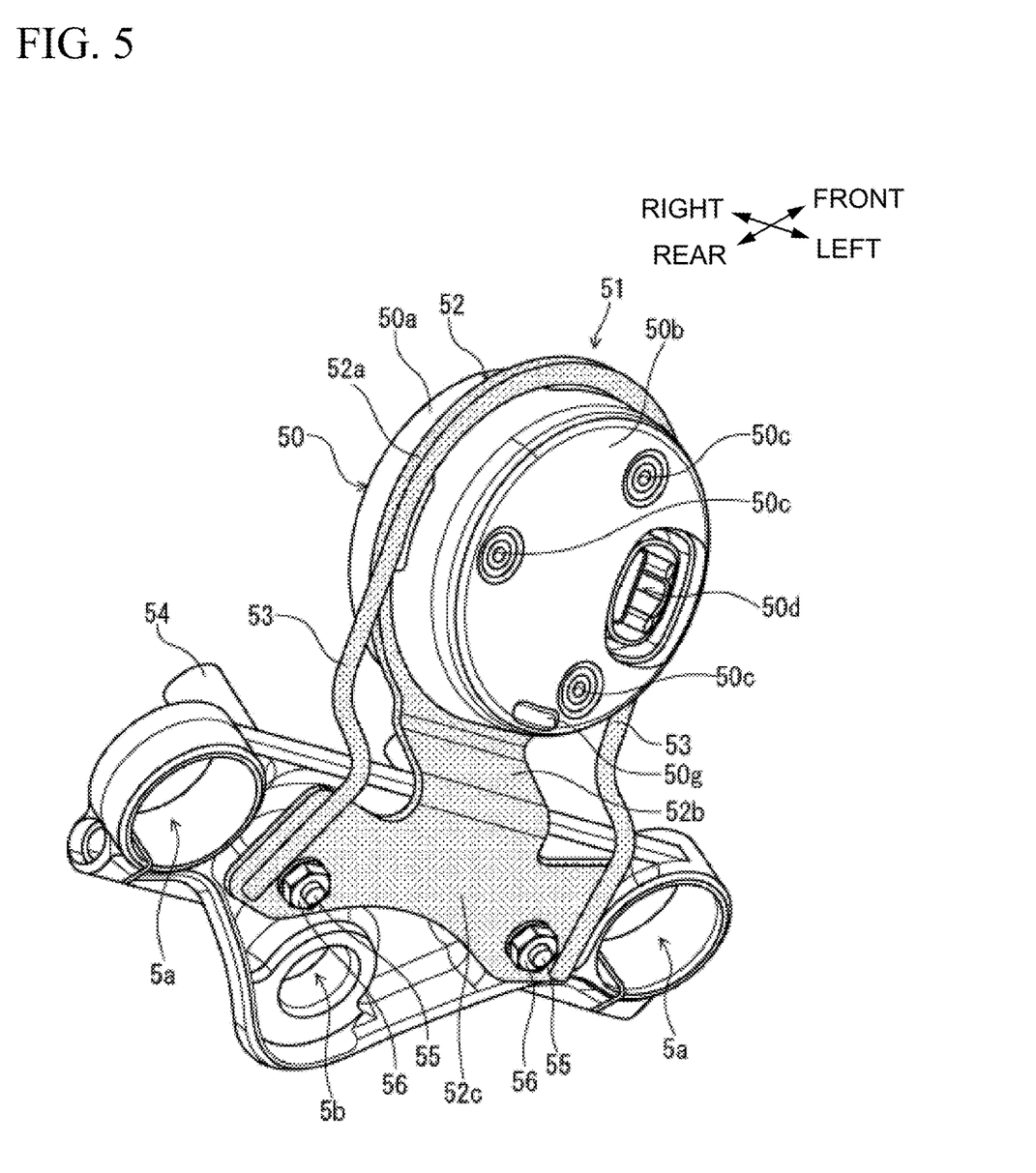
FIG. 5 is a perspective view of the top bridge and the meter device as seen from a front side of the vehicle body.
Figure 6:
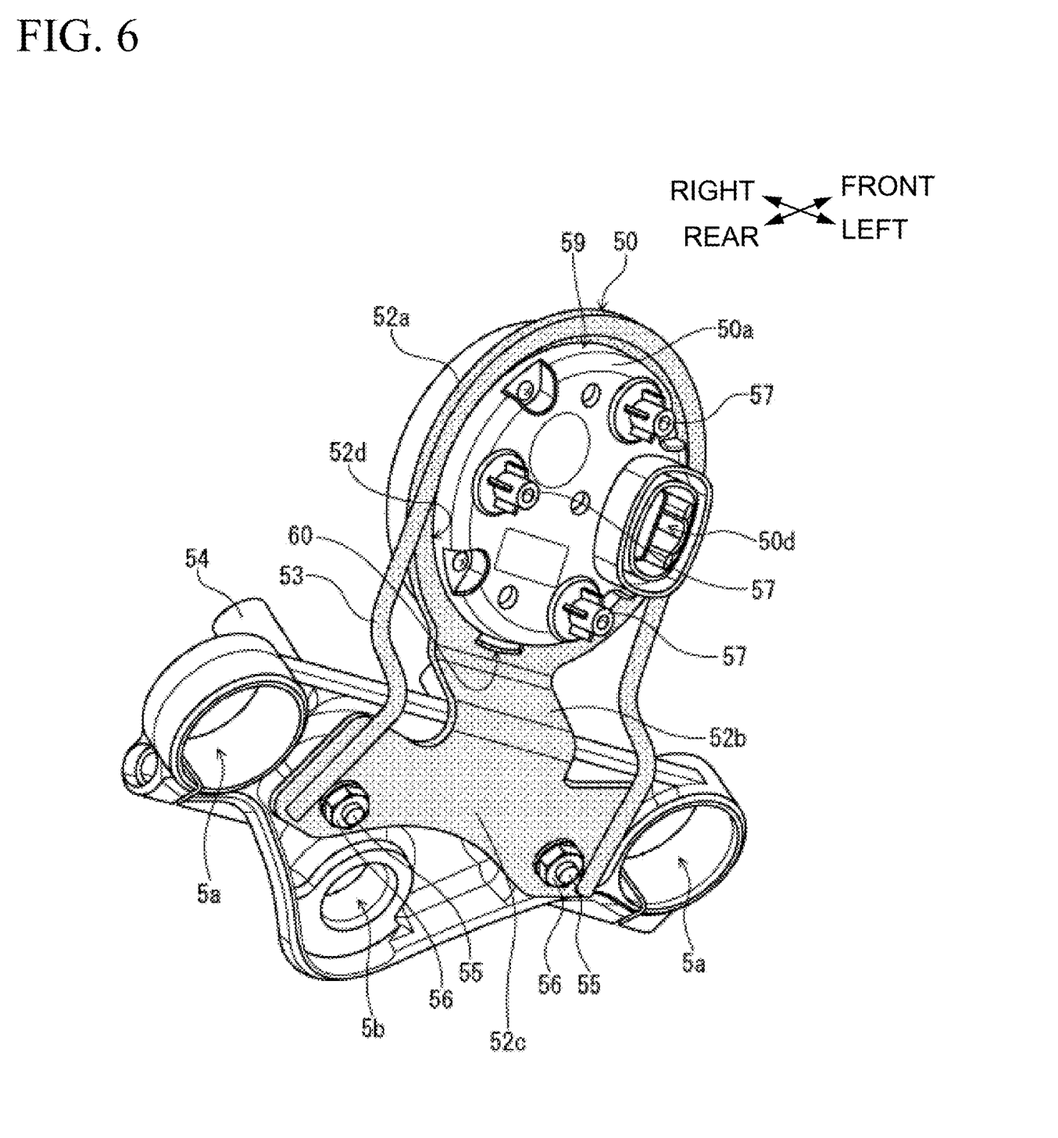
FIG. 6 is a perspective view showing a state in which a lower case is detached from the meter device.
Figure 7:
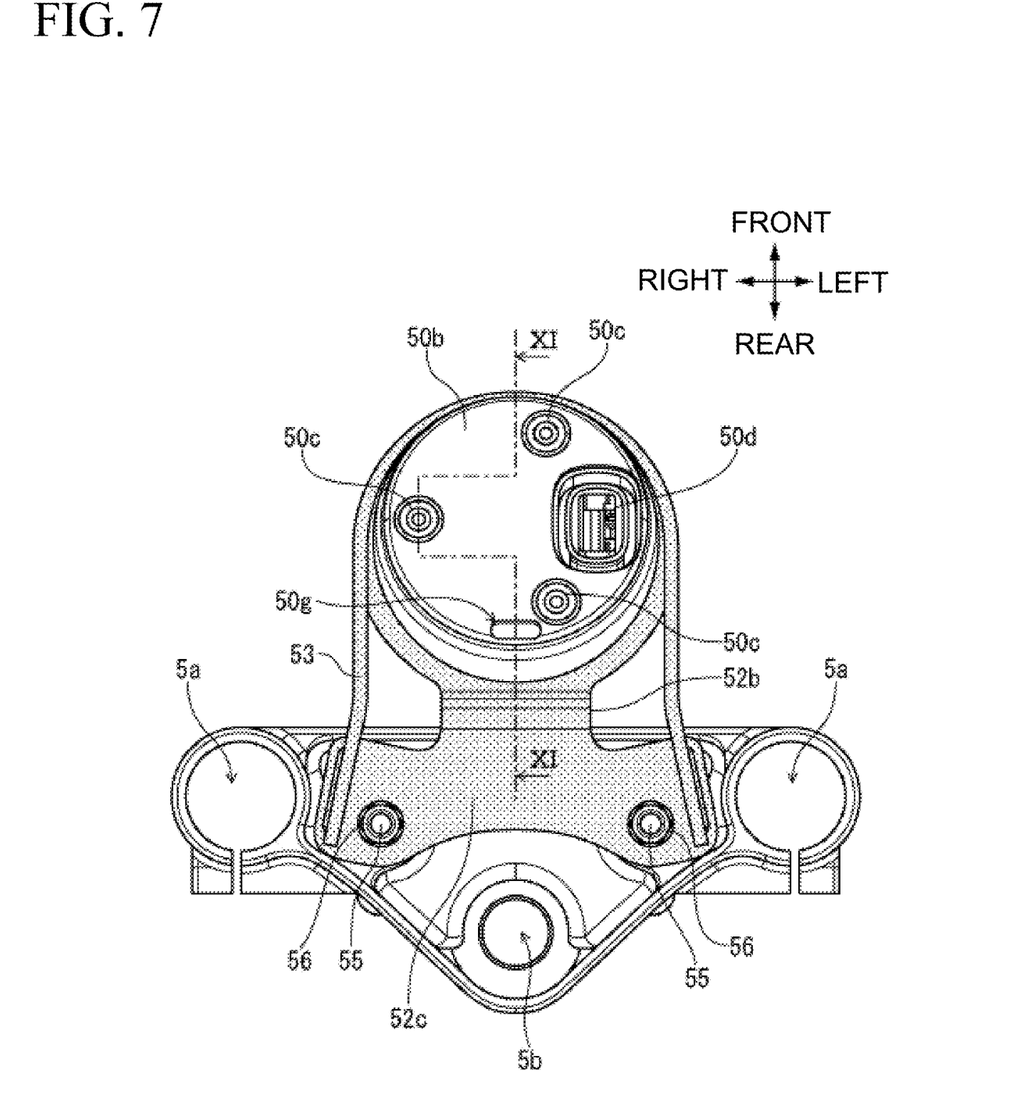
FIG. 7 is a bottom view showing a state in which the top bridge and the meter device are supported.

FIG. 5 is a perspective view of the top bridge 5 and the meter device 50 as seen from the front side of the vehicle body. FIG. 6 is a perspective view showing a state in which the lower case 50b is detached from the meter device 50 of FIG. 5, and FIG. 7 is a bottom view showing a state in which the top bridge 5 and the meter device 50 are supported.

The meter device 50 is assembled by fitting the upper case 50a and the lower case 50b so as to sandwich the plate-shaped part 52 and attaching fasteners such as screws to three fixing parts 50c. Specifically, a fitting part 59 is formed in the upper case 50a, the fitting part 59 having a smaller diameter than the outer diameter of the upper case 50a as seen from the outside. Also, an opening 52d in which the fitting part 59 can be inserted is formed in the fitting part 52a. With this configuration, by inserting the fitting part 59 in the opening 52d from the upper side of the vehicle body and attaching the lower case 50b from the lower side of the vehicle body, the meter device 50 is affixed to the meter stay 51 at the same time that the meter device 50 is assembled.

Three mounting bosses 57 corresponding to the fixing parts 50c are provided on a lower surface side of the upper case 50a. A harness mount 50d projecting downward from the bottom part of the upper case 50a is exposed downward from an oblong-shaped opening formed in the lower case 50b. A drain hole 50g with an oblong shape is formed in the lower surface of the lower case 50b at a position toward the lower part of the vehicle body. As shown in FIG. 6, a notch 60 as part of a concavo-convex section for positioning the lower case 50b in the rotational direction is formed in the opening 52d of the fitting part 52a at a position toward the rear of the vehicle body.

Figure 8:
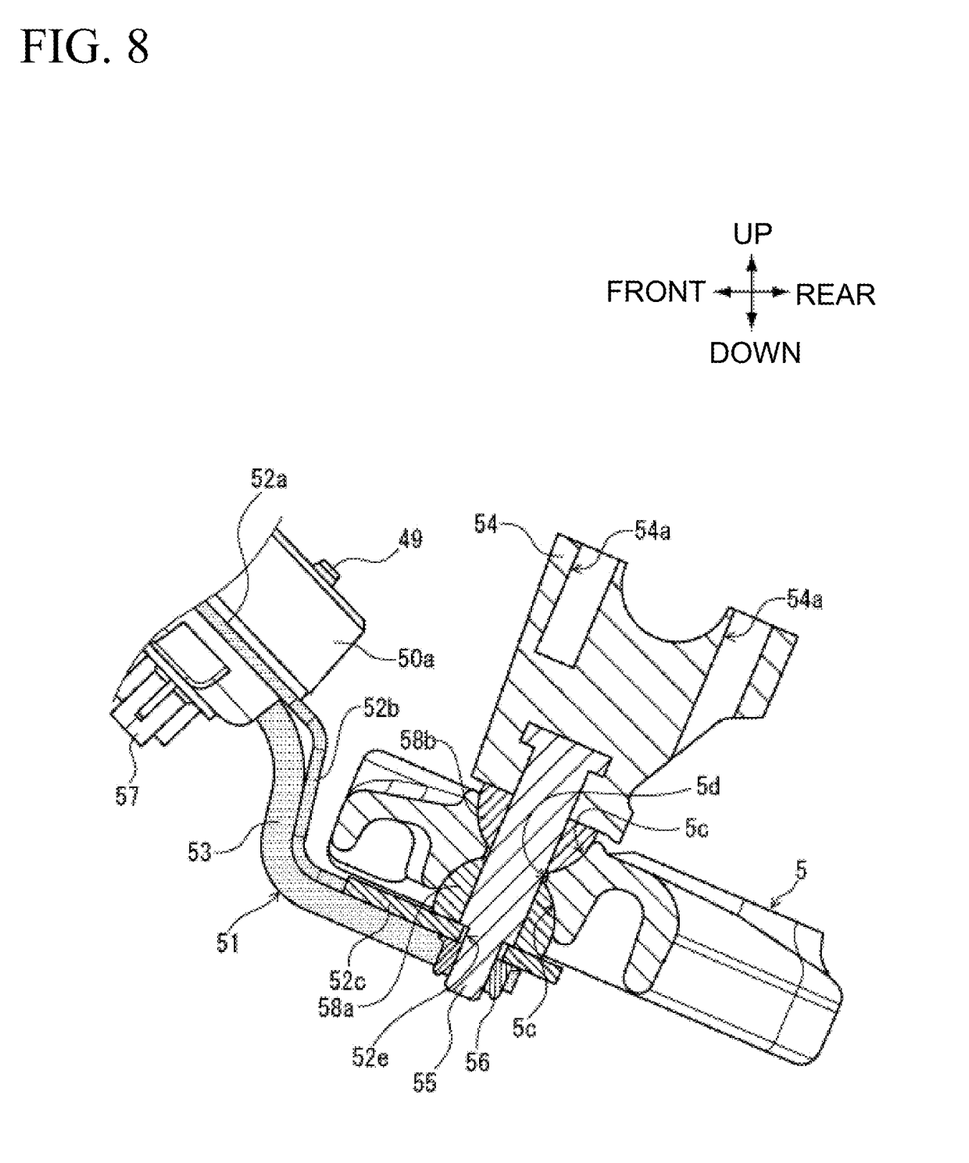
FIG. 8 is a cross-sectional view taken along line VIII-VIII in FIG. 3.
Figure 9:
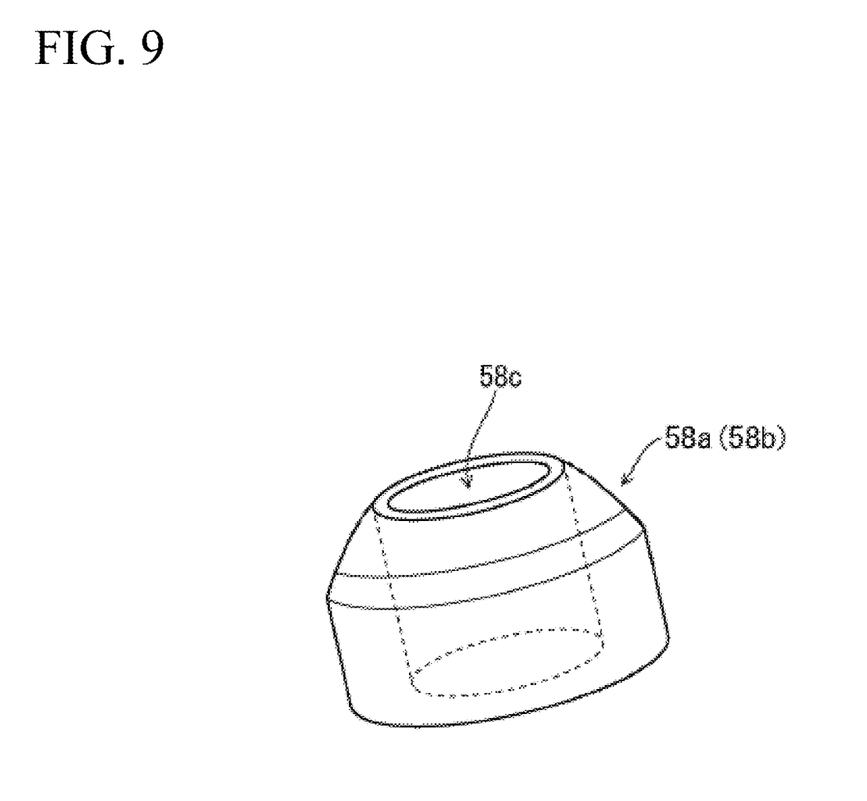
FIG. 9 is a perspective view of an elastic member.

FIG. 8 is a cross-sectional view taken along line VIII-VIII in FIG. 3. FIG. 9 is a perspective view of an elastic member 58a. A through hole 58c, through which the shaft member 55 passes, is formed in the elastic member 58a, and a through hole 52e, through which a small diameter threaded part formed at a tip of the shaft member 55 passes, is formed in the support part 52c of the plate-shaped part 52.

The meter stay 51 is mounted in a floating manner on the top bridge 5 by the elastic member 58a, which is made of rubber or the like. Specifically, a through hole 5d, through which the shaft member 55 of the handle clamp 54 passes, and an enlarged diameter part 5c, which expands in a bowl shape at a lower part of the through hole 5d, are formed in the top bridge 5. The elastic member 58a is accommodated in the enlarged diameter part 5c, and the shaft member 55 is passed therethrough in a state in which the support part 52c of the meter stay 51 is made to abut a lower surface side of the elastic member 58a. When the nut 56 is tightened on a thread of the shaft member 55, a floating mount is achieved in which the support part 52c does not make contact with the lower surface of the top bridge 5.

In the support structure for a meter stay according to the present embodiment as described above, there are provided the shaft member 55, which extends downward at the lower surface of the handle clamp 54, and the elastic member 58a, which is in contact with the lower surface of the top bridge 5. Since the meter stay 51 is in contact with the lower surface of the elastic member 58a, and the shaft member 55 passes through the top bridge 5, the elastic member 58a, and the meter stay 51 in this order, and the nut 56 is coupled to the distal end of the shaft member 55, it is possible to mount the meter stay 51 on the lower surface side of the top bridge 5 in a floating manner by using the shaft member 55 and the fixing member 56 for affixing the handle clamp 54 to the top bridge 5. Compared with a constitution in which the attachment part of the handle clamp and the attachment part of the meter stay 51 are separately provided on the top bridge 5, it is thereby possible to simplify the support structure, reduce the number of parts, and achieve a reduction in size of the top bridge 5. Further, by mounting the meter stay 51 in a floating manner, there is no need to provide an elastic member between the meter device and the meter stay 51, and so the degree of freedom in designing the meter device 50 and the meter stay 51 can be enhanced.

The through hole 5d, through which the shaft member 55 passes, is formed in the top bridge 5, and the hemispherical enlarged diameter part 5c, in which the elastic member 58a is accommodated on the lower surface side of the top bridge 5, is formed in the through hole 5d. Therefore, by the elastic member 58a being accommodated in the enlarged diameter part 5c formed on the lower surface side of the top bridge 5, it is possible to minimize the amount of protrusion of the elastic member 58a toward the lower surface side of the top bridge 5, which enables a reduction in size in the thickness dimension in the vicinity of the top bridge 5. Further, the elastic member 58a is hardly visible from the outside, and therefore the appearance around the top bridge 5 can be enhanced.

In the present embodiment, the handle clamp 54 is also mounted in a floating manner to the top bridge 5. Specifically, an enlarged diameter part 5c is formed at an upper part of the through hole 5d, a second elastic member 58b is accommodated in the enlarged diameter part 5c, and the handle clamp 54 is abutted against the upper surface side of the second elastic member 58b. When the nut 56 is tightened, a floating mount is achieved in which the bottom part of the handle clamp 54 does not make contact with the upper surface of the top bridge 5. That is, the meter stay 51 and the handle clamp 54 are simultaneously mounted in a floating manner by the shaft member 55 and the nut 56.

At this time, by the second elastic member 58b being accommodated in the enlarged diameter part 5c formed on the upper surface side of the top bridge 5, it is possible to minimize the amount of protrusion of the second elastic member 58b toward the upper surface side of the top bridge 5, and so it is possible to enhance the appearance around the handle clamp 54. Further, in the present embodiment, by making the enlarged diameter parts 5c vertically symmetrical and achieving common parts utilization of the elastic member 58a and the second elastic member 58b, it is possible to reduce the manufacturing cost and prevent erroneous assembly at the time of assembly.

Figure 10:
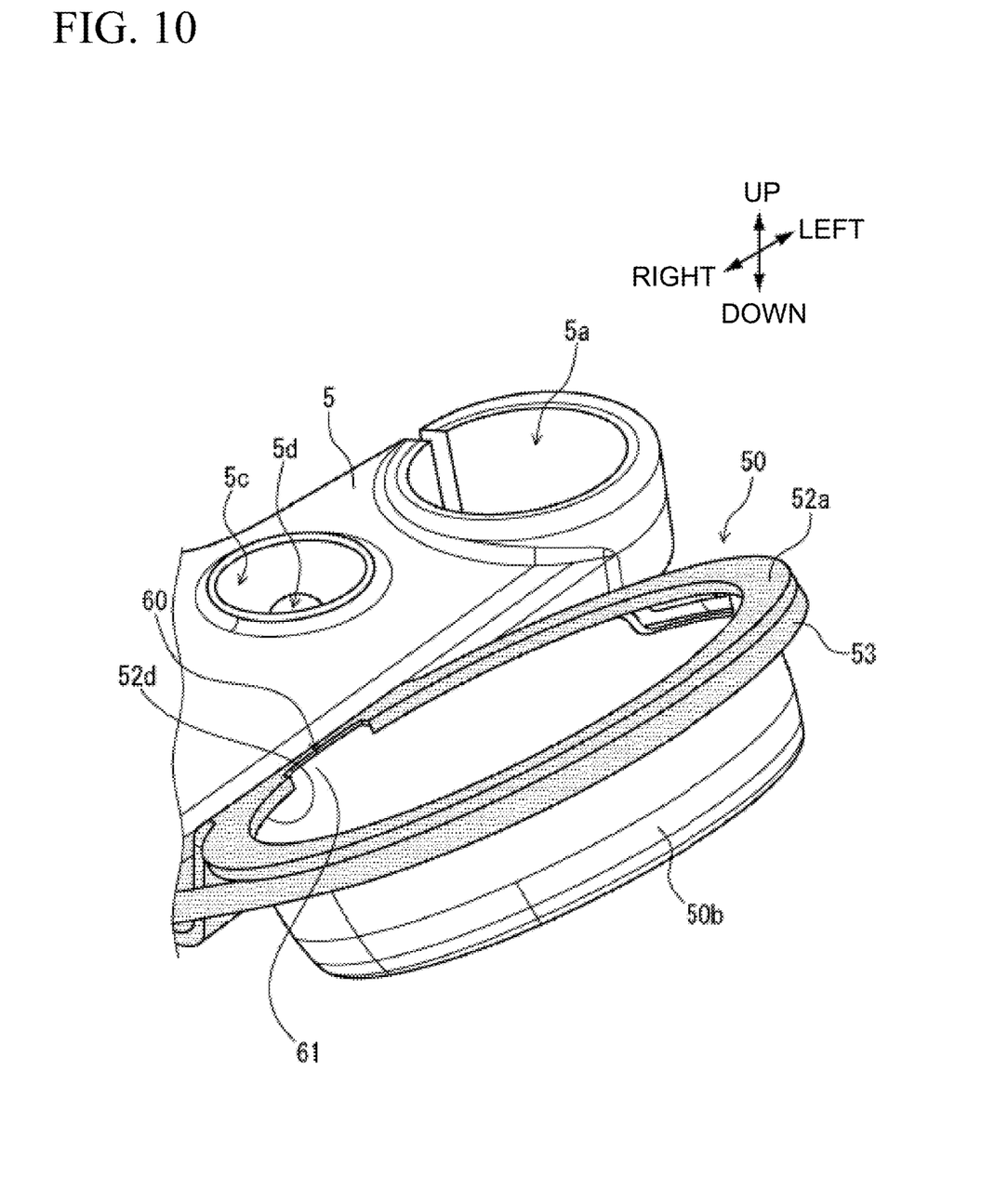
FIG. 10 is a perspective view showing a positioning structure between a fitting part and the lower case.

FIG. 10 is a perspective view showing a positioning structure between the fitting part 52a and the lower case 50b. As described above, the notch 60, which accommodates a positioning protrusion 61 formed in an upper edge of the lower case 50b, is formed in the opening 52d of the fitting part 52a. When assembling the meter device 50, since the position in the rotation direction is specified by the lower case 50b in accordance with the concavo-convex section composed of the notch 60 and the positioning protrusion 61, assembly is facilitated. It is to be noted that a plurality of these concavo-convex sections may be provided between the fitting part 52a and the lower case 50b.

Figure 11:
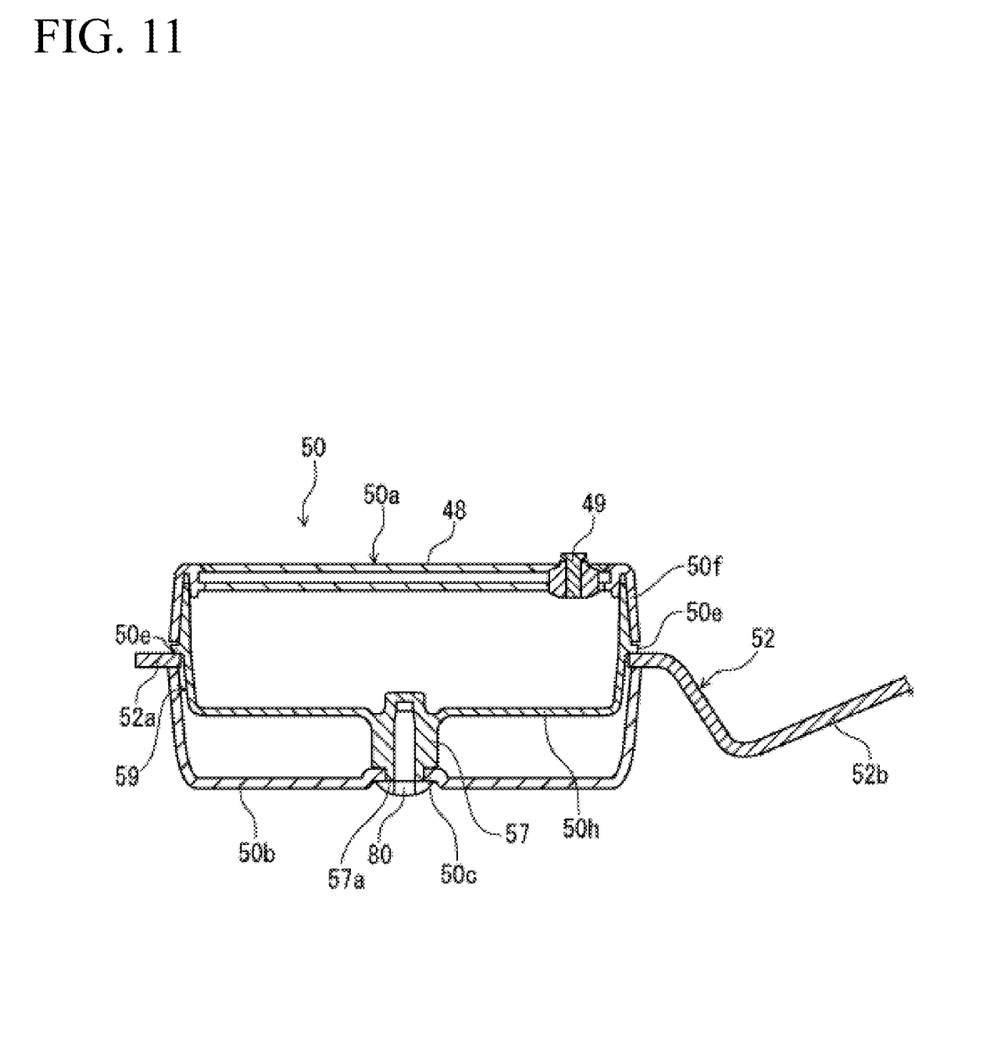
FIG. 11 is a cross-sectional view taken along line XI-XI in FIG. 7.

FIG. 11 is a cross-sectional view taken along line XI-XI in FIG. 7. In the upper case 50a, a lid 50f for supporting a cover 48 and an operation button 49 is affixed above a container 50h that accommodates a liquid crystal panel, various indicators, an electronic substrate and the like, with the cover 48 being attached to an upper part of the lid 50f. An annular flange 50e is formed on an outer peripheral surface of the container 50h at a substantially central portion in the vertical direction to be in contact with an upper surface of the fitting part 52a.

A distal end 57a of each attachment boss 57 extending from a bottom of the container 50h engages with a fixing part 50c formed in the lower case 50b. By screwing a mounting screw 80 from the lower side of the lower case 50b into the attachment boss 57, the upper case 50a and the lower case 50b are attached to each other. A second concavo-convex section composed of this distal end 57a and the fixing part 50c facilitates positioning of the upper case 50a and the lower case 50b. Since the lower case 50b is positioned on the fitting part 52a by the concavo-convex section 60 and 61 as described above, assembly of the meter device 50 is facilitated by the upper case 50a being positioned with respect to the lower case 50b, which has been positioned on the meter stay 51.

Figure 12:
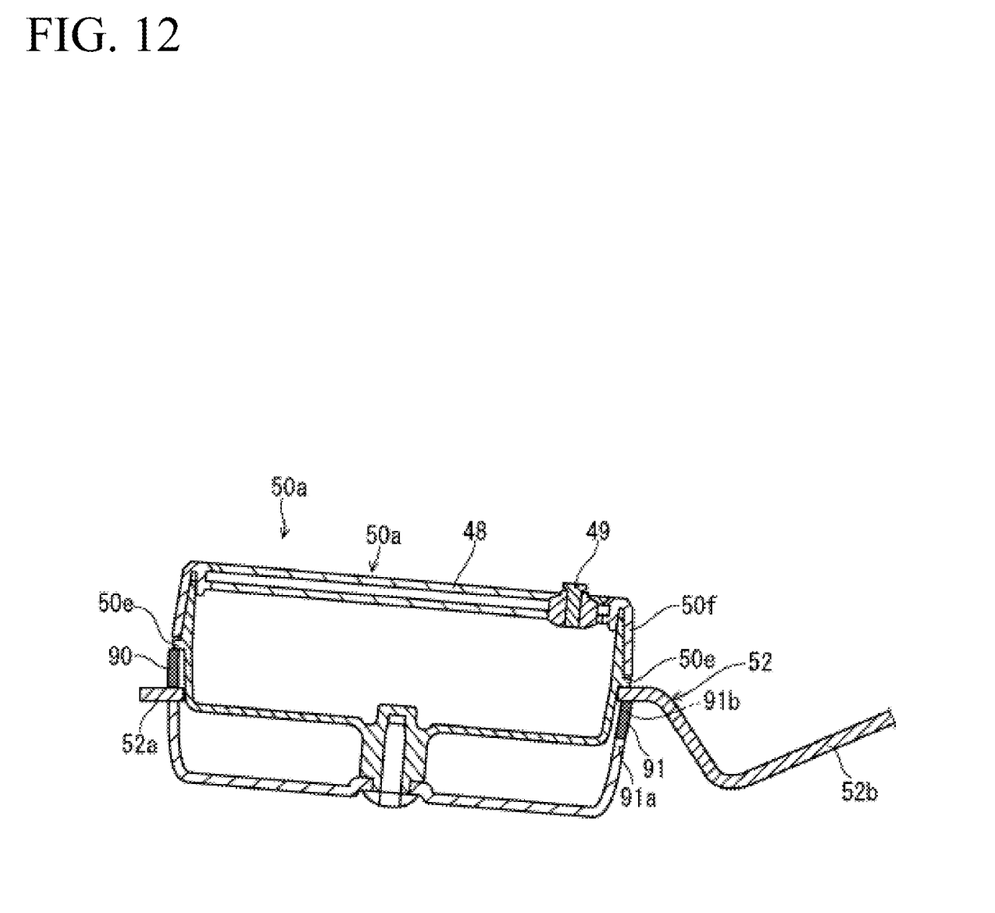
FIG. 12 is a cross-sectional view showing a state in which an upper spacer and a lower spacer are applied.

FIG. 12 is a cross-sectional view showing a state in which an upper spacer 90 and a lower spacer 91 are applied. By applying the upper spacer 90 and the lower spacer 91, which are vertically symmetrical, it is possible to easily adjust the angle of the meter device 50 with respect to the meter stay 51. Specifically, by using the upper spacer 90 disposed between the upper case 50a and the fitting part 52a and the lower spacer 91 disposed between the fitting part 52a and the lower case 50b, the upper case 50a and the lower case 50b can be inclined by the same angle.

The upper spacer 90 and the lower spacer 91 are each made of a thin plate member and shaped as if a single cylindrical member were divided in two by a sloping surface. Accordingly, it is possible to arbitrarily change the angle of the meter device 50 by sandwiching the spacers 90 and 91 having a simple structure. It is thereby not necessary to provide an angle adjustment function in the meter stay 51 side, and so the structure of the meter stay 51 can be simplified.

By forming a lower concavo-convex section 91a, which engages with the positioning protrusion 61 of the lower case 50*b*, in a lower part of the lower spacer 91 and by forming an upper concavo-convex section 91*b*, which engages with the notch 60 formed in the opening 52*d*, in an upper part of the lower spacer 91, positioning of the meter device 50 in the rotational direction can be performed easily even when the upper spacer 90 and the lower spacer 91 are applied.

The form of the saddled vehicle, the shape and structure of the meter device, the shape and structure of the meter stay, and the shape and structure of the handle clamp and the elastic member are not limited to the above embodiment, with various modifications being possible. For example, the shape of the opening formed in the fitting part of the meter stay is not limited to a circular shape, and can be an oval shape or a polygonal shape in accordance with the shape of the meter device. Further, the shape of the fitting part is not limited to an annular shape and may be formed in a square shape or the like according to the shape of the meter device. The support structure for a meter stay according to the present invention is not limited to a motorcycle but can be applied to a saddled vehicle with three wheels or four wheels having a top bridge.

REFERENCE SIGNS LIST 1 motorcycle (saddled vehicle)
3 steering handle
5 top bridge
5*c* enlarged diameter part
5*d* through hole
10 front forks
50 meter device
51 meter stay
50*a* upper case
50*b* lower case
52 plate-shaped part
52*a* fitting part
52*d* opening
54 handle clamp
55 shaft member
58*a* elastic member
58*b* second elastic member
56 nut (fixing member)
60 notch (concavo-convex section)
61 positioning protrusion (concavo-convex section)
50*c* fixing part (second concavo-convex section)
57*a* distal end (second concavo-convex section)
90 upper spacer
91 lower spacer
91*a* lower concavo-convex section
91*b* upper concavo-convex section
WF front wheel

What is claimed is:

1. A support structure for a meter stay applied to a saddled vehicle including a left-right pair of front forks rotatably supporting a front wheel, a top bridge coupling upper ends of the left and right front forks, and a handle clamp supporting a steering handle above the top bridge, the support structure for a meter stay, comprising:
    a shaft member extending downwardly and disposed on a lower surface of the handle clamp;
    an elastic member in contact with a lower surface of the top bridge;
    a meter stay in contact with a lower surface of the elastic member and supporting a meter device; and
    a fixing member coupled to a distal end of the shaft member,
    wherein the shaft member passes through the top bridge, the elastic member, and the meter stay in this order.

2. The support structure for a meter stay according to claim 1, wherein
    the top bridge has a through hole for passing the shaft member therethrough; and
    a hemispherical enlarged diameter part is formed in the through hole for accommodating the elastic member on a lower surface side of the top bridge.

3. The support structure for a meter stay according to claim 2, wherein
    the meter stay has a fitting part having an opening for accommodating the meter device,
    the meter device includes an upper case and a lower case, and
    the meter device is supported by the meter stay by affixing the upper case and the lower case with the fitting part being sandwiched between the upper case and the lower case.

4. The support structure for a meter stay according to claim 2, further comprising:
    a second elastic member disposed between the handle clamp and the top bridge to be penetrated by the shaft member.

5. The support structure for a meter stay according to claim 1, further comprising:
    a second elastic member disposed between the handle clamp and the top bridge to be penetrated by the shaft member.

6. The support structure for a meter stay according to claim 5, wherein:
    the elastic member and the second elastic member are common components.

7. The support structure for a meter stay according to claim 6, wherein
    a hemispherical enlarged diameter part is formed in the through hole for accommodating the second elastic member on an upper surface side of the top bridge.

8. The support structure for a meter stay according to claim 5, wherein
    a hemispherical enlarged diameter part is formed in the through hole for accommodating the second elastic member on an upper surface side of the top bridge.

9. A support structure for a meter stay applied to a saddled vehicle including a left-right pair of front forks rotatably supporting a front wheel, a top bridge coupling upper ends of the left and right front forks, a handle clamp supporting a steering handle above the top bridge, and a meter stay supporting a meter device, the support structure for a meter stay, comprising:
    a shaft member extending downwardly and disposed on a lower surface of the handle clamp; and
    an elastic member in contact with a lower surface of the top bridge,
    wherein the meter stay is in contact with a lower surface of the elastic member,
    wherein the shaft member passes through the top bridge, the elastic member, and the meter stay in this order, with a fixing member being coupled to a distal end of the shaft member,
    wherein the meter stay has a fitting part having an opening for accommodating the meter device,
    wherein the meter device includes an upper case and a lower case, and wherein the meter device is supported by the meter stay by affixing the upper case and the lower case with the fitting part being sandwiched between the upper case and the lower case.

10. The support structure for a meter stay according to claim 9, further comprising:
a concavo-convex section disposed between the opening and the lower case to perform positioning in a direction of mutual rotation therebetween.

11. The support structure for a meter stay according to claim 10, further comprising:
a second concavo-convex section disposed between the upper case and the lower case for positioning in both rotation directions thereof.

12. The support structure for a meter stay according to claim 11, further comprising:
an upper spacer disposed between the upper case and the meter stay to cause the upper case to be inclined by a predetermined angle, and
a lower spacer disposed between the meter stay and the lower case to cause the lower case to be inclined by the same angle as that in the upper case.

13. The support structure for a meter stay according to claim 11, further comprising:
a second elastic member disposed between the handle clamp and the top bridge to be penetrated by the shaft member.

14. The support structure for a meter stay according to claim 10, further comprising:
an upper spacer disposed between the upper case and the meter stay to cause the upper case to be inclined by a predetermined angle, and
a lower spacer disposed between the meter stay and the lower case to cause the lower case to be inclined by the same angle as that in the upper case.

15. The support structure for a meter stay according to claim 10, further comprising:
a second elastic member disposed between the handle clamp and the top bridge to be penetrated by the shaft member.

16. The support structure for a meter stay according to claim 9, further comprising:
an upper spacer disposed between the upper case and the meter stay to cause the upper case to be inclined by a predetermined angle, and
a lower spacer disposed between the meter stay and the lower case to cause the lower case to be inclined by the same angle as that in the upper case.

17. The support structure for a meter stay according to claim 16, further comprising:
a lower concavo-convex section disposed below the lower spacer to be engaged with the concavo-convex section of the lower case for positioning in a rotation direction; and
an upper concavo-convex section disposed above the lower spacer to be engaged with the concavo-convex section in the opening for positioning in a rotation direction.

18. The support structure for a meter stay according to claim 17, further comprising:
a second elastic member disposed between the handle clamp and the top bridge to be penetrated by the shaft member.

19. The support structure for a meter stay according to claim 16, further comprising:
a second elastic member disposed between the handle clamp and the top bridge to be penetrated by the shaft member.

20. The support structure for a meter stay according to claim 9, further comprising:
a second elastic member disposed between the handle clamp and the top bridge to be penetrated by the shaft member.

* * * * *